UNITED STATES PATENT OFFICE.

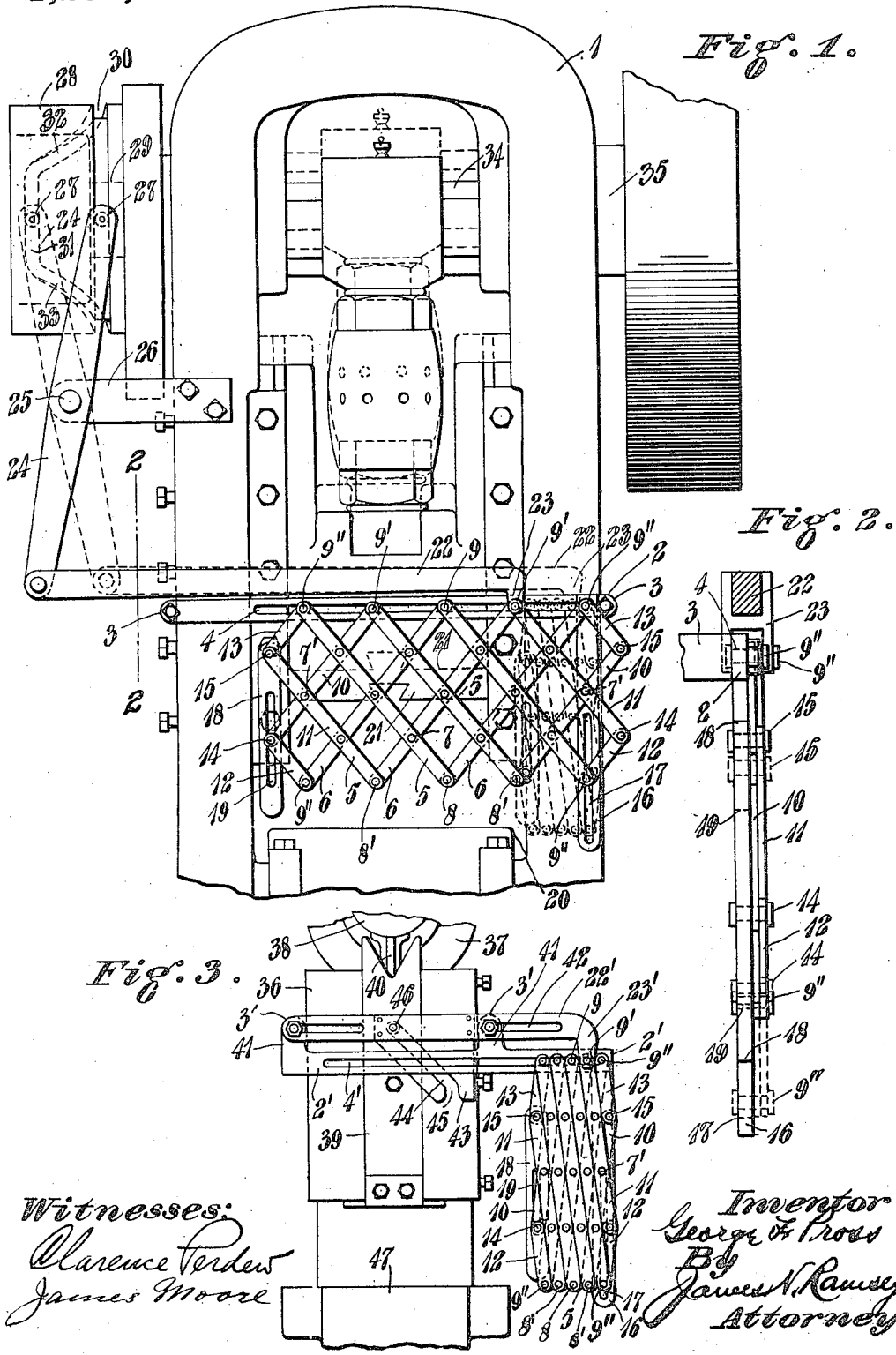

GEORGE F. PROSS, OF CINCINNATI, OHIO.

GUARD FOR MACHINES.

1,259,554.      Specification of Letters Patent.      Patented Mar. 19, 1918.

Application filed August 18, 1917. Serial No. 186,901.

*To all whom it may concern:*

Be it known that I, GEORGE F. PROSS, a citizen of the United States, and a resident of Cincinnati, in the county of Hamilton and State of Ohio, have invented certain new and useful Improvements in Guards for Machines, of which the following is a specification.

My invention relates to guards, and its object is prevention of injury to the operators of machines, and more especially of power-presses, such as are used for punching, forming and the like on metal and other various materials.

My invention consists in the combination of parts and in the details of construction and arrangement of parts as will hereinafter be more fully described and claimed.

In the drawing:

Figure 1 is a front view of a power-press with my invention applied thereto;

Fig. 2 is a partial vertical section on a plane corresponding to the line 2—2 of Fig. 1; and Fig. 3 is a front view of a different kind of power press with my invention applied thereto in a modified manner.

As I prefer to construct my invention, the guard is made up of a plurality of bars pivoted together in such a way as to form a collapsible lattice-work, on what is ordinarily known as the "lazy tongs" principle, with the pivotal connection of two of the bars near one end fixed to some convenient part of the machine at one side thereof and with a pivotal connection of two other of the bars near this end suitably operatively connected to some operative part of the machine; so that this lattice structure is extended or collapsed as the machine assumes a condition dangerous to the operator or recovers therefrom.

Thus, as shown in Fig. 1, the straight-sided punch or die press 1 has fixed across its front a horizontal bar 2 by means of studs 3 fixed to the outer sides of the machine frame, and having throughout most of its length a straight longitudinal slot 4. The collapsible lattice structure, or "lazy tongs" is, as here shown, made up of three long bars 5 equally spaced and crossing three equally spaced long bars 6. These bars 5 and 6 are pivoted together where they cross by pivots 7, and two of them are pivoted together at their lower ends by a pivot 8, and one of these and the third one at their upper ends by a pivot 9. To complete the structure at respective ends, shorter bars 10 and 11 cross each other and cross the adjacent long bars 5 and 6 and are pivoted to them by pivots 7' at the aforesaid intervals, and have their upper and lower ends, respectively, connected to the respective ends of the middle long bars 5 and 6 by pivots 8' and 9'; and the ends of these shorter bars 10 and 11 are connected to the adjacent ends of long bars 6 and 5 by short links 12 and 13 pivoted to the bars 6 and 5 by pivots 9" and to the bars 10 and 11 by pivots 14 and 15, respectively.

The upper pivot 9" at the right, looking toward the machine, as in Fig. 1, is fixed to the bar 2; and the other upper pivots 9, 9' and 9", in the order of their succession to the left, are all slidable in the slot 4 in said bar 2.

A vertical bar 16 is fixed to the bar 2 and extends vertically downward therefrom, and has a vertical slot 17; and in this slot slides the lower pivot 9" of the long bar 5 and link 12.

At the left of the structure, a stile 18 is connected to the pivot 15 of the bar 5 and link 13, and extends vertically downward with a vertical slot 19 in which slides the pivot 14 of the bar 10 and link 12.

It will thus be seen that the horizontal bar 2 supports the movable cross-bars and links and the vertical bar 16 guides them, so that a movement of any one of the pivots to the left along the slot 4 causes the structure to be exended and to hold the stile 18 always in vertical position, and slightly rising as it travels to the left. The bar 2 is mounted at such a height on the machine that the cross-bars can swing over the right-hand edge of the machine bed 20; and the stile 18 is made of such length that its lower end will never be very far from the top of the bed 20. The vertical guide-bar 16 extends far enough down to permit the lowermost position required of the lower right-hand pivot 9" to allow the structure to be completely collapsed.

Thus it will be seen that when the structure is collapsed, as indicated by the dotted lines in Fig. 1, free access is had to the space above the bed 20 and under the slide 21 where the material operated upon is to be placed; but when the structure is extended, as indicated by the solid lines, its crossing bars so impede access to this part of the machine, that the danger of the operator getting his hand or other part of the body in this space is practically eliminated. Moreover, during the extension of the structure, the stile 18 traveling across the bed 20 will push the operator's hand or arm or other part of his body to the left and out of the dangerous position if this extension of the structure be effected with sufficient force; and will thus effect this displacement before the dangerous condition is reached in the operation of the machine if suitably connected to some operating means that will suitably operate the structure in unison with the operation of the machine.

As illustrated in Fig. 1, this operative connection comprises a connecting rod 22 extending across the front of the machine and having a downward extension 23 connected to the right-hand upper pivot 9' next to the fixed pivot 9''. The other end of this connecting rod 22 is pivoted to the lower end of a lever 24 which extends up and has a fulcrum 25 near its middle on a bracket 26 fixed to and extending from the left side of the machine-frame, and having mounted near its upper end, a roller 27. A drum or cylinder cam 28 is fixed on the projecting end of the driving shaft 29 of the machine 1 to turn therewith, and has a slot 30, which, for the greater part of the circumference lies over near the right-hand end of the cam 28, but for a minor part of the circumference has a section 31 lying near the left end of the cam and approached by helical sections 32 and 33 from the main part 30. The roller 27 bears in this slot, and the section 31 is so located relative to the crank or eccentric 34 of the machine that the roller 27 occupies this slot only when the crank or eccentric 34 holds the slide 21 up at such a height as not to endanger the operator under the circumstances hereinbefore pointed out; and so as the clutch 35 turns the shaft 29 in either direction to any such extent as to lower the slide 21 sufficient to endanger the operator under these circumstances, the roller 27 will be moved to the right, and the opposite end of the lever 24 will pull the right-hand upper pivot 9' to the left along the slot 4, so that the collapsible lattice structure will be rapidly extended across the bed 20; and if the operator has not withdrawn his hand or arm or other part of his body from the dangerous position, he will be pushed therefrom by contact of the stile 18 traveling rapidly to the left. At the same time, the motion of this displacing mechanism being transversely of the machine and toward the entirely empty space at the left, it cannot appreciably injure the operator when it forcibly pushes him out of the way as is the case where a guard travels down along a machine toward the bed thereof and is liable to squeeze the operator between itself and said bed. Furthermore, with the operative connection of the guard directly to the driving shaft that operates the slide or other part to be guarded against, the guard is more certain to be brought into guarding position when the machine assumes its dangerous condition than where the guard is operated in connection with some part of the machine that is manually operated to start the machine in its process of assuming the dangerous condition; as for instance, where the guard is brought into guarding position by the same means that manipulates the clutch of the press.

Where desirable, the operating means for the guard may be modified, and comprises a part mounted directly on the slide of the press. This is especially desirable where the driving shaft of the machine extends from front to rear thereof, as in the machine shown in Fig. 3, instead of from side to side as in the machine shown in Fig. 1.

The driving shaft of the machine 36 is not shown in Fig. 3, but part of its bearing 37 and of the eccentric strap 38 are shown in such a manner as to indicate the type of machine illustrated, which has its slide 39 connected by a pitman 40 to the eccentric strap 38 in such a manner as to be operated up and down by rotation of the shaft and eccentric not shown.

Here, the guard is constructed substantially the same as in the preceding example, having the modified horizontal bar 2' with the upwardly extending lugs 41 fixed to the studs 3' extending forward from the outer sides of the machine frame, and having the longitudinal slot 4' in which all of the upper pivots except the extreme right-hand one slide, as in the preceding example; and these pivots and all of the parts of the mechanism therebelow being indicated by the same characters as in the other example.

The connecting rod 22' has the downward extension 23' connected to the extreme right-hand upper pivot 9' and has longitudinal slots 42 into which extend projections of the studs 41, whereby the rod 22' is horizontally guided.

Fixed on the connecting rod 22' is a flat cam-plate 43 with a slot 44 that inclines downwardly to the right, and has a flaring lower entrance opening 45. A roller 46 is mounted on the press slide 39 and bears in the slot 44; the location of this roller on the slide 39 and of the cam-plate 43 on the rod 22 being such that the initial part of the downward travel of the slide 39 causes the connecting rod 22' to be pushed to the left, and, by its action on the pivot 9', to cause the collapsible lattice structure to rapidly extend to the left across the bed 47 of the machine 36 in the same manner as in the preceding example.

In order to facilitate understanding of the examples, I have used the terms right and left specifically according to these examples, and other details of the examples have been more or less specifically described; but it will be understood that my invention is susceptible to various modifications and changes in position relative to the machine on which it is used in order to meet the various requirements encountered in applying my invention to various kinds, not only of punch presses, but of any other kinds of power-driven machines where a guard is required, and where my invention in its broadest aspects may be made suitable by such modification. Accordingly, I do not wish to be understood as being limited to the precise examples herein set forth, but

What I claim as new and desire to secure by Letters Patent is:

In a guard for a machine, an extensible and expansible lattice structure comprising a plurality of longer bars crossing each other diagonally in the middle of the structure, and successively shorter elements connected to these longer bars and forming the end parts of the structure, whereby there are a plurality of upper pivots along the upper edge of the structure, a plurality of lower pivots along the lower edge of the structure, and a plurality of lateral pivots at opposite ends of the structure, a transverse guide extending along the upper part of said structure, one of said upper pivots near one end of said structure being fixed relatively to said guide, and the others of said upper pivots being movably held in and guided by said transverse guide, an upright guide fixed to said transverse guide in alinement with the pivot that is fixed relatively to the guide and extending down and receiving one of said lower pivots near said end of the structure to slide up and down in said upright guide, a stile secured to one of the lateral pivots at the opposite end of the structure and extending down and receiving another one of said lateral pivots at said opposite end of the structure for movement up and down in said stile, and operative connecting means connected to one of said upper pivots that is guided in said transverse guide, said guard being adapted to be fixed in suitable position on a machine for extension across said machine, and said operative connecting means being adapted to be connected to an operating part of the machine, whereby said guard is extended when said operating part is assuming a position dangerous to an operator having access to the machine in the space across which said guard is thus extended, substantially as and for the purposes set forth.

GEORGE F. PROSS.

Witnesses:
 CLARENCE PERDEW,
 ELIZABETH DAVIS.

Copies of this patent may be obtained for five cents each, by addressing the "Commissioner of Patents, Washington, D. C."